United States Patent [19]

Staerman

[11] 3,774,811
[45] Nov. 27, 1973

[54] APPARATUS FOR OBTAINING SYNTHETIC FOAM MATERIALS

[76] Inventor: Leon Staerman, 4, rue des Lilas, Aulnay-sous-Bois, Seine Saint-Denis, France

[22] Filed: Dec. 6, 1971

[21] Appl. No.: 205,131

[30] Foreign Application Priority Data
Dec. 10, 1970 France .............................. 7044491

[52] U.S. Cl. .................. 222/190, 222/229, 425/244
[51] Int. Cl. ............................................. B29b 3/00
[58] Field of Search ....................... 425/4, 244, 245, 425/817; 222/190, 355, 229, 394; 239/567, 343

[56] References Cited
UNITED STATES PATENTS
1,995,215   3/1935   Mehisen et al. ................ 239/343 X
3,007,202   11/1961   Wucher .......................... 425/245 X
3,163,693   12/1964   Steuger .......................... 425/245 X FOREIGN PATENTS OR APPLICATIONS
6,636   6/1962   Japan ................................ 425/244

1,190,301   3/1959   France ............................. 424/245
1,260,167   5/1961   France ............................. 425/244

*Primary Examiner*—Robert B. Reeves
*Assistant Examiner*—David A. Scherbel
*Attorney*—Merriam, Marshall, Shapiro & Klose

[57] ABSTRACT

In the production of a foam plastics material by a transfer injection process, the transfer nozzle is withdrawn from the foaming chamber as it injects plasticized material into that chamber so that the newly injected material does not compress previously injected material and, until the foaming is complete, there is no movement of the material in the foaming chamber apart from its expansion during foaming. The transfer nozzle directs material against the walls of the foaming chamber. It is valved so that a return movement of the nozzle into the foam chamber can expel foamed material from that chamber.

3 Claims, 3 Drawing Figures

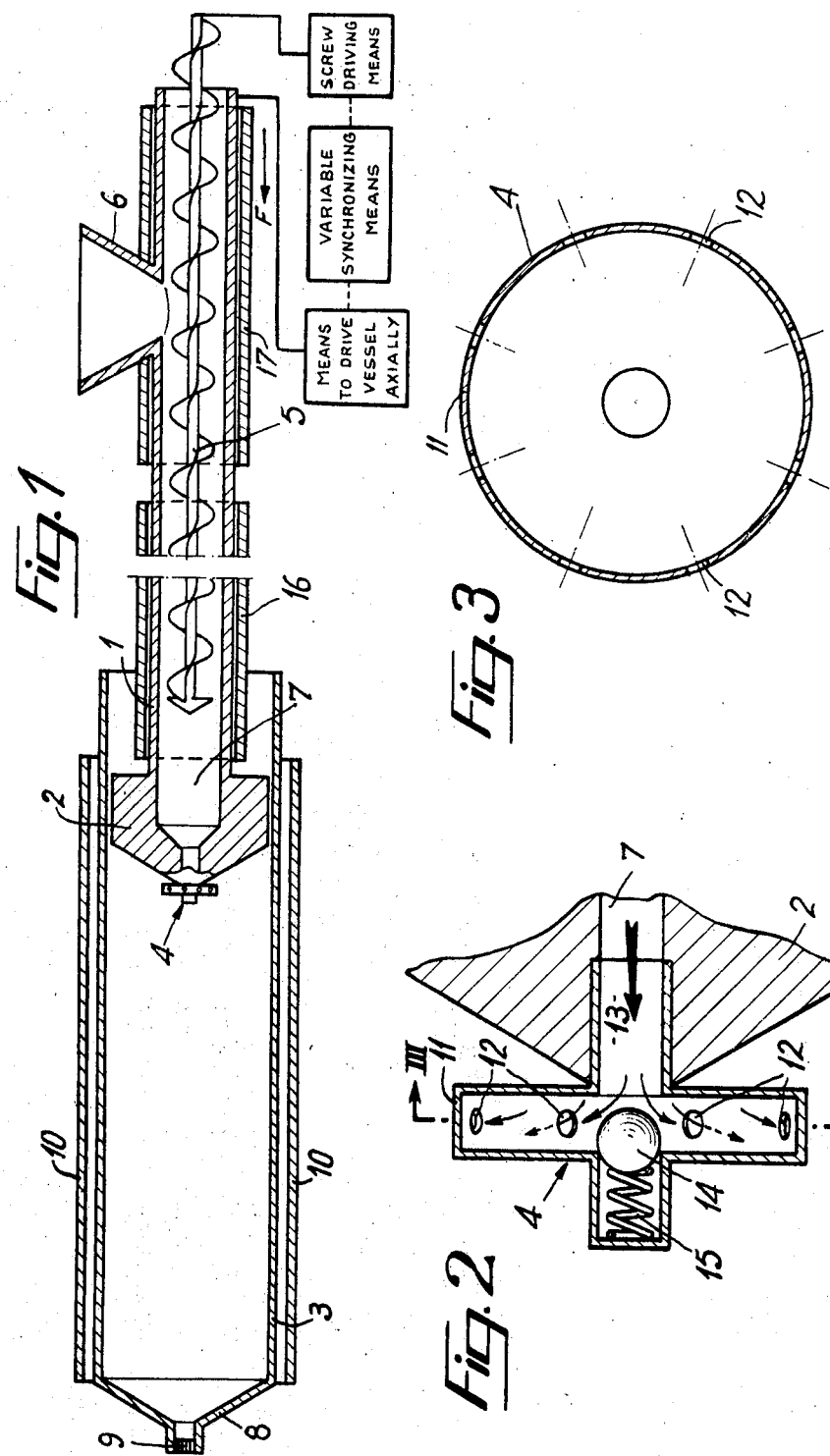

APPARATUS FOR OBTAINING SYNTHETIC FOAM MATERIALS

BACKGROUND OF THE INVENTION

The present invention concerns a method and an apparatus for obtaining synthetic foam materials.

In known transfer injection processes, the synthetic material mixed with a foaming agent is put into a first vessel called a plasticising vessel and containing a plasticising chamber where it is plasticised without foaming, after which the plasticised material is transferred, through a nozzle, into a second vessel called a foaming vessel and containing the foaming chamber where it is foamed. It is then injected, for example into moulds.

Until now apparatuses for carrying out this process have had serious disadvantages because the synthetic material, at the moment of transfer from the plasticizing chamber to the foaming chamber, presses against the foam already formed or forming in the foaming chamber. Unless it does this it cannot get into the foaming chamber. The result of this is that the foaming of the incident synthetic material is not carried out under good conditions; also the foam already formed, because it has to move because of the action of this incident material, is made denser and sticks to the walls of the foaming vessel. Lastly, the incident material must foam under atmospheric pressure.

SUMMARY OF THE INVENTION

The present invention does away with these disadvantages by arranging that plasticised synthetic material, mixed with a foaming agent, is introduced through the transfer nozzle into a foaming chamber in such a way that each portion of foamed material is formed in a specific spot, reserved for it, in the said foaming chamber which is then under reduced pressure.

Thus, the foam is not, as in the known method, formed in a single place (close to the transfer nozzle) in the foaming vessel, then pressed on by the subsequently incident matter. Also this foam forms at a time when the foaming vessel is under reduced pressure, and does not have to fight against atmospheric pressure.

In order to carry out the process according to the invention, an apparatus can have a plasticising vessel in the form of a piston acting with a cylindrical foaming vessel, a transfer nozzle borne by the said plasticising vessel allowing it to communicate with the foaming chamber within the foaming vessel.

Thus when the plasticising vessel retreats from the foaming chamber, a reduced pressure is created and because the transfer nozzle is then open, the plasticised material is introduced into the foaming chamber, the foam created being put therein successively to that previously created.

Preferably, the transfer nozzle is a valve nozzle allowing the foam to be directed, not onto the previously introduced foam, but in the direction of the inside walls of the foaming vessel. If the foam being formed is projected onto the foam already formed, it spoils the latter. In addition, if the foam is directed onto the walls, they then form a support away from which the foam can develop freely towards the inside of the foaming chamber.

Advantageously the foaming vessel has an injection nozzle for the final expulsion of the foam from the apparatus and injection into e.g. a mould which is closed during the retreat of the plasticising vessel and the formation of the foam and which is open after foam formation in order to allow for injection of foam through it under the influence of the movement of the plasticising vessel towards the injection nozzle.

In an advantageous manner of embodying the invention, the plasticising vessel carries with it a feed apparatus for synthetic material to be plasticised, for example an endless screw, and the retreating movement of the plasticising vessel from the foaming chamber is linked with the movement of the feed apparatus in such a way that the quantity of foam formed at the transfer nozzle corresponds to the free space left in the foaming chamber by the retreat of the plasticising vessel. It can be seen that, by regulating the relationship between the movement of the feed apparatus and the retreating movement of the piston, it is possible to alter the density of the foam obtained.

DESCRIPTION OF DRAWINGS AND OF ONE EMBODIMENT OF THE INVENTION

The Figures of the attached drawing shows one example of embodiment of the invention.

In this drawing:

FIG. 1 is a longitudinal schematic section of the apparatus.

FIG. 2 is a sectional view of an enlarged scale of the transfer nozzle of the apparatus in FIG. 1.

FIG. 3 is a section along the line III—III of FIG. 2.

The apparatus shown in FIG. 1 has an elongated plasticising vessel 1, ending in a piston head 2 coacting with a cylindrical foaming vessel 3, which acts as a cylinder in fluid-tight sliding relation with the head 2. The inside of the plasticising vessel 1 can be put into communication with the foaming chamber within the foaming vessel 3 means of a valved transfer nozzle 4.

The plasticising vessel 1 has an endless feed screw 5, which is rotatable and is also mounted axially movably and is subjected (in known manner) to a plasticising counterpressure indicated by the arrow F. A hopper 6 allows for a synthetic material for plasticising to be brought, with a foaming agent, to the screw 5. A plasticising chamber 7 is defined in variable manner in the vessel 1, between the transfer nozzle 4 and the end of the screw 5. In the chamber material is plasticised without foaming.

The foaming vessel 3 is closed, at its end opposite the vessel 1, by an end wall 8 in which is mounted an injection nozzle 9 provided with a closure valve. Heating jackets 10 and 16 surround respectively the foaming vessel 3 and the plasticising vessel 1, whilst the latter is surrounded, at its end remote from the head 2, by cooling jackets 17 for cooling the material to be plasticised in that region, which then prevents back flow of the plasticised material.

The transfer nozzle 4, mounted on the head 2 of the piston and coaxially with the centre axis of the piston and cylinder, has a cylindrical crown 11 also co-axial with the cylinder 3 and pierced by regularly spaced-apart holes 12. This nozzle communicates with the plasticising chamber 7 by means of a narrow duct 13 which can be closed by a ball 14, urged towards such closure by a spring 15.

The making of foam material with the apparatus shown in the Figures takes place, in accordance with the invention in the following way.

Let us assume that first the injection nozzle 9 is closed and that the piston head 2 is near the said nozzle. A synthetic material to be plasticised is introduced, with a foaming agent, into the hopper, 6 and taken by the screw 5 into the plasticising chamber 7, the transfer nozzle 4 being closed. The synthetic material is therefore plasticised under known conditions and accumulated in the chamber 7 and when the pressure of the plasticised material becomes greater under the action of the screw 5 than that exerted by the spring 15 on the ball 14, the latter is pushed back against the action of the spring, and allows the plasticised material to flow through the duct 13 and the holes 12 into the foaming vessel 3. The shape of the nozzle 4, with its crown 11, is such that the material is directed towards and onto the wall of the cylinder which forms the foaming vessel 3. Thus the wall acts as a support for the foamed material as it expands into the free space left in the radially central portion of the chamber 3.

Simultaneously, the plasticising vessel 1 retreats within the vessel 3, that is to say the piston head 2 moves away from the nozzle 9, which remains closed. The plasticised material escaping through the holes 12 is thrown out, into the vessel 3, behind the foam already formed, and its forming is aided by the reduced pressure created in the foaming chamber in the vessel 3 by the movement of the vessel 1.

The apparatus according to the invention includes means (not shown) for synchronisation of the movement of the screw 5 and of the retreating motion of the vessel 1, in such a way that the quantity of foam formed at the exit of the nozzle 4 corresponds to the volumne of the space created, in the vessel 3, by the retreat of the vessel 1. Thus the foam issuing from the nozzle 4 is deposited into a part of the foaming chamber which is, as it were, reserved for it and in which it does not move, except, for its expansion while foaming, until the final expulsion of the foamed material from the foaming chamber.

When the pressure of the plasticised mass in the chamber 7 gets less, the transfer nozzle 4 closes, that is to say that the ball 14 once again closes the duct 13. The vessel 1 is then given a motion towards the injection nozzle 9. The foam formed in the vessel 3 is thus pressed against this nozzle 9 which opens. To this end, this nozzle 9 can be of the valve type. The foam is then injected through the nozzle 9.

After the injection of this foam it is possible to begin again the cycle which has just been described.

It can likewise be seen, that if the linkage between the retreating movement of the piston 2 and the movement of the screw 5 is adjustable, it is possible to alter the density of the foam obtained in the vessel 3.

I claim:

1. Apparatus comprising:

a plasticizing chamber, in a plasticizing vessel, in the shape of a piston, in which a synthetic material is plasticized without foaming, a foaming vessel with a foaming chamber in the shape of a cylinder coacting with said piston, means to supply the plasticizing chamber with synthetic material, this means being carried by the plasticizing vessel, A transfer nozzle between the plasticizing chamber and the foaming chamber through which plasticized material can be transferred from the chamber to the foaming chamber in which it is foamed, means to increase the volume of the foaming chamber while moving the transfer nozzle in the foaming chamber to deposit foamed synthetic material in successive positions in the foaming chamber; and means to decrease the volume of the foaming chamber to expell foam therefrom while maintaining the volume of the plasticizing chamber constant.

2. Apparatus according to claim 1 wherein the transfer nozzle is a nozzle urging the foam in the direction of the wall of the foaming vessel.

3. Apparatus according to claim 2 wherein the transfer nozzle has a cylindrical crown with axis parallel to that of the piston and cylinder and provided with holes spaced over its surface, this crown being linked to the plasticising chamber by a valved duct, and wherein the foaming vessel has an injection nozzle adapted to be closed during the retreat of the plasticising vessel and the formation of the foam and to be open, after the formation of the latter, whereby a reduced pressure may be induced in the foaming chamber during retreat of the plasticising vessel and the formed foam may be injected by means of the displacement of the said plasticising vessel towards the said injection nozzle.

* * * * *